US009390553B2

(12) United States Patent
Tokashiki et al.

(10) Patent No.: US 9,390,553 B2
(45) Date of Patent: Jul. 12, 2016

(54) INFORMATION DISPLAY PROGRAM AND INFORMATION DISPLAY DEVICE

(71) Applicant: SONY CORPORATION, Tokyo (JP)

(72) Inventors: Mamoru Tokashiki, Tokyo (JP); Satoshi Nagata, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/342,674

(22) PCT Filed: Jun. 11, 2013

(86) PCT No.: PCT/JP2013/066103
§ 371 (c)(1),
(2) Date: Mar. 4, 2014

(87) PCT Pub. No.: WO2014/010358
PCT Pub. Date: Jan. 16, 2014

(65) Prior Publication Data
US 2015/0235413 A1    Aug. 20, 2015

(30) Foreign Application Priority Data
Nov. 7, 2012  (JP) ................................. 2012-155990

(51) Int. Cl.
G06T 17/10    (2006.01)
G06T 15/20    (2011.01)

(52) U.S. Cl.
CPC  *G06T 17/10* (2013.01); *G06T 15/20* (2013.01)

(58) Field of Classification Search
CPC ...................................................... G06T 17/10
See application file for complete search history.

(56) References Cited

U.S. PATENT DOCUMENTS

2005/0140676 A1*  6/2005  Cho .................... G01C 21/3635
345/440

FOREIGN PATENT DOCUMENTS

JP    2000-242809 A    9/2000
JP    2001-338311 A    12/2001
JP    2010-181447 A    8/2010

OTHER PUBLICATIONS

International Search Report issued Aug. 13, 2013 in PCT/JP2013/066103.

* cited by examiner

Primary Examiner — Maurice L McDowell, Jr.
(74) Attorney, Agent, or Firm — Oblon, McClelland, Maier & Neustadt, L.L.P

(57) ABSTRACT

Provided is an information display program causing a computer to perform, a perspective projection data storage process of storing perspective projection data of a three-dimensional structure including multiple overlapping planes, a relevant information storage process of storing relevant information relevant to the multiple planes, a perspective projection display control process of displaying a perspective projection image of a whole of the three-dimensional structure, a parallel projection data storage process of storing parallel projection data for displaying a parallel projection image of the multiple planes, a parallel projection display control process of displaying the parallel projection image of the multiple planes, a transition calculation process of calculating transition image data to perform transition from the perspective projection image to the parallel projection image, a transition display control process of displaying a transition image, and a relevant information display control process of displaying the relevant information.

4 Claims, 8 Drawing Sheets (α)　　　　　　　(β)

INFORMATION DISPLAY PROGRAM AND INFORMATION DISPLAY DEVICE

TECHNICAL FIELD

The present disclosure relates to an information display program and an information display device displaying, for example, a three-dimensional structure such as a building in a line view on a screen.

BACKGROUND ART

In general, guide displays in buildings are posted in department stores, shopping centers, show rooms, galleries, museums, or the like. Also, similar guide displays are printed on free distributed pamphlets in many cases.

In some of the guide displays, as guides of entire buildings, rectangles indicating respective floors are displayed in a multi-layered manner and shops, products for sale, and exhibition contents are shown in the respective rectangles. Also, as the guides of the respective floors, the positions of shops or exhibition articles are shown in a plan view.

CITATION LIST

Patent Literature

Patent Literature 1: JP 2010-181447A

SUMMARY OF INVENTION

Technical Problem

In the above-described guide displays, however, it is difficult to understand where the spaces of shops or the like desired by users are located in view of the whole building. For example, in the case of a guide of the whole building in which respective floors are displayed in a multi-layered manner, character information is merely arranged inside the rectangle indicating each floor. For this reason, the users may not know the position of the desired spaces unless the users go to each floor and see the plan view of each floor.

The plan view of each floor may be posted in the entrance of a building. However, when there are a plurality of floors, a large posting space is necessary. Also, it is troublesome to search for desired spaces in the guides of the plurality of floors.

In the above-described guide displays, it is difficult for the users to understand where the users are currently located in a building. In some cases, a current position is displayed on the plan view of each floor. However, the users may not understand the positions of the users other than the currently displayed positions. Also, in the plan view of each floor, the users may not understand where the users themselves are located in the whole building.

There is a technology for displaying a current position navigationally together with a floor screen in an information terminal (see Patent Literature 1). In this case, however, it is difficult to intuitively understand a desired space, a current position, or the like by a relation with the whole building.

The present disclosure is devised to resolve the problems of the technology of the related art described above and an object of the present disclosure is to provide an information display program and an information display device in which desired information regarding a three-dimensional structure can be intuitively understood in relation to the whole three-dimensional structure.

Solution to Problem

According to the present disclosure in order to achieve the purpose above, there is provided an information display program causing a computer including a display unit to perform a perspective projection data storage process of storing perspective projection data of a three-dimensional structure including a plurality of overlapping planes, a relevant information storage process of storing relevant information relevant to the plurality of planes, a perspective projection display control process of displaying a perspective projection image of a whole of the three-dimensional structure on the display unit based on the perspective projection data, a parallel projection data storage process of storing parallel projection data for displaying a parallel projection image of the plurality of planes included in the three-dimensional structure, a parallel projection display control process of displaying the parallel projection image of the plurality of planes on the display unit based on the parallel projection data, a transition calculation process of calculating transition image data to perform transition from the perspective projection image to the parallel projection image or from the parallel projection image to the perspective projection image based on the perspective projection data and the parallel projection data, a transition display control process of displaying a transition image between the perspective projection image and the parallel projection image calculated through the transition calculation process on the display unit, and a relevant information display control process of displaying the relevant information on the display unit.

The present disclosure can also be understood as an information display device realizing a function of each of the foregoing processes.

According to another embodiment of the present disclosure, in the transition calculation process, the plurality of planes in the parallel projection image are moved in a direction in which overlap of the plurality of planes in the parallel projection image is reduced more than overlap of the plurality of planes in the perspective projection image.

According to another embodiment of the present disclosure, a position information detection unit detecting a current position may be connected to the computer. The information display program may cause the computer to perform a position information display control process of displaying the current position detected by the position information detection unit in at least one of the perspective projection image and the parallel projection image.

According to another embodiment of the present disclosure, an input unit may be connected to the computer. When one of the planes in the perspective projection image is selected through an input from the input unit, the information display program may cause the computer to perform the transition calculation process and the transition display control process and to set the relevant information displayed in the relevant information display control process as relevant information regarding the selected plane.

Advantageous Effects of Invention

According to the present disclosure described above, since an image in which planes included in a three-dimensional structure displayed in a perspective projection manner are transitioned to a parallel projection image is displayed and information relevant to the planes is displayed, desired infor-

DESCRIPTION OF EMBODIMENTS

Next, modes (embodiments) for carrying out the present disclosure will be described specifically with reference to the drawings. The present embodiments can be realized by controlling an information display device such as a smartphone or a tablet terminal serving as a computer by a program. In this case, a hardware or program realization aspect can be modified in various ways.

Also, the present disclosure can be understood as the foregoing program or a computer-readable storage medium recording the program. The description will be made below with reference to a virtual block diagram illustrating each function of the present embodiments as a block.

1. Configuration

Figure 1:
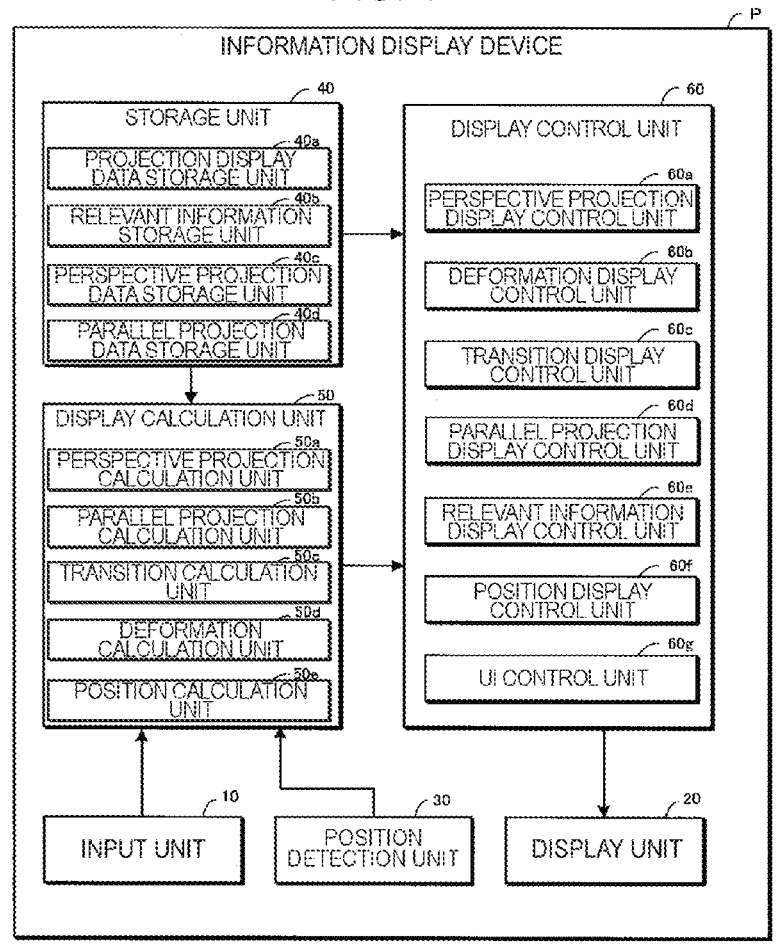
FIG. 1 is a block diagram illustrating an information display device according to an embodiment.

An information display device P according to the present embodiment includes an input unit 10, a display unit 20, and a position detection unit 30 included in a general information display device, as illustrated in FIG. 1.

The input unit 10 is an input device used by a user to input information necessary for a process or an operation of the present embodiment. The input unit 10 includes a touch panel to be described below and a switch formed on the casing of the information communication device P. Also, the input unit 10 includes an audio input device including a microphone and an audio recognition unit. That is, in the present embodiment, an operation by audio is also possible.

The display unit 20 is an output device such as a display that displays an image visually recognized by the user. The touch panel serving as the input unit 10 is provided in the display unit 20. The user can perform an input operation such as tapping or swiping using the touch panel configured in the display unit 20. The position detection unit 30 is a processing unit that includes a geomagnetic sensor and a GPS detection unit and detects a current position.

Also, the information display device P according to the present embodiment includes a storage unit 40, a display calculation unit 50, and a display control unit 60.

The storage unit 40 is a processing unit that stores information necessary for a process of the present embodiment. The storage unit 40 includes a projection display data storage unit 40a, a relevant information storage unit 40b, a perspective projection data storage unit 40c, and a parallel projection data storage unit 40d.

The projection display data storage unit 40a is a processing unit that stores projection display data of a three-dimensional structure for performing perspective projection calculation and parallel projection calculation. The projection display data includes, for example, 3-dimensional coordinate data regarding apexes of the exterior and interior shapes of a three-dimensional structure and lines binding the apexes. The three-dimensional structure includes a plurality of overlapping planes. For example, a building including a plurality of floors as planes is included in the three-dimensional structure.

The relevant information storage unit 40b stores information relevant to a plurality of planes included in a three-dimensional structure. For example, when a three-dimensional structure is a building including a plurality of floors as planes, the relevant information includes the number of floors and a name, a function, products for sale, exhibition articles, shops, and images of each floor. The images also include still images and moving images.

The relevant information also includes information acquired via a network by a transmission and reception unit generally included in a smartphone or a tablet terminal. For example, a live image of each floor and written text data such as Tweets are also included in the relevant information.

The perspective projection data storage unit 40c is a processing unit that stores perspective projection data which is a calculation result by a perspective projection calculation unit 50a to be described below. The parallel projection data storage unit 40d is a processing unit that stores parallel projection data which is a calculation result by a parallel projection calculation unit 50b to be described below.

The display calculation unit 50 is a processing unit that calculates information to be displayed on the display unit 20. The display calculation unit 50 includes the perspective projection calculation unit 50a, the parallel projection calculation unit 50b, a transition calculation unit 50c, a deformation calculation unit 50d, and a position calculation unit 50e.

The perspective projection calculation unit 50a is a processing unit that calculates a perspective projection image used to display a three-dimensional structure in a perspective projection manner based on the projection display data. The parallel projection calculation unit 50b is a processing unit that calculates a parallel projection image used to display a three-dimensional structure in a parallel projection manner based on the projection display data. The transition calculation unit 50c is a processing unit that calculates a transition image in the course of transition between the perspective projection image and the parallel projection image in response to an instruction input from the input unit 10.

In the present embodiment, the perspective projection image and the parallel projection image are calculated based on the perspective display data, and the transition image can be obtained by linear interpolation between each point of the perspective projection image and each point of the parallel projection image. As a method of calculating each image, various methods including general calculation methods can be applied. An example will be described below.

First, perspective projection calculation by the perspective projection calculation unit 50a is, for example, the following calculation performed on each point forming a three-dimensional structure. That is, when a point of view is located at a position R on the z axis in a 3-dimensional xyz space, an xy plane is considered as a projection plane. Then, when a point obtained by causing a point P (x, y, z) in the xyz space to be perspective and projected to the xy plane is assumed to be P" (x", y", 0), x" and y" can be expressed as follows:

$$x''=R*x/(R-z), \text{ and}$$

$$y''=R*y/(R-z).$$

When a rotation element is added thereto, the following expression is given:

$$x''=R*x/(R-z)+P*z+S, \text{ and}$$

$$y''=R*y/(R-z)+Q*z+T.$$

Here, R/(R−z) indicates an effect by a perspective, P and Q indicate change amounts (which may be fixed values, considering that rotation stops) according to a rotation angle, and S and T indicate values related to vanishing points.

The parallel projection calculation by the parallel projection calculation unit 50b is different from general parallel projection calculation, and the following calculation is performed by setting the coefficients R/(R−z) related to a scaling rate in the foregoing perspective projection calculation to coefficients I and J which are not dependent on z.

$$x'=I*x+K*z+M$$

$$y'=J*y+L*z+N$$

Here, K and L indicate change amounts (fixed values) according to a rotation angle, as in the foregoing P and Q, and M and N indicate values determined by a position relation with the origin point and used to determine a position at which a projected image is located.

$$R/(R-z) \to I$$

$$P*z \to K*z$$

$$S \to M$$

$$T \to N$$

$$R/(R=z) \to J$$

$$Q*z \to L*z$$

Also, methods of setting respective coefficients of the above expressions can be considered to be various, e.g., a method of performing linear interpolation for each parameter and changing specific balance while taking the specific balance can be considered. Adjusting a distance up to a projection plane, a zoom ratio, or the like is also included in the method.

The transition calculation unit 50c is a processing unit that calculates a transition image in the course of transition between the perspective projection image and the parallel projection image in response to an instruction input from the input unit 10. The transition calculation unit 50c performs linear interpolation to obtain a point between a point (x", y") obtained through the perspective projection calculation and a point (x', y') obtained through the parallel projection calculation. That is, a starting point and an ending point are first calculated by each projection scheme and the linear interpolation is performed during the calculation.

Here, a time t is set from transition start and transition end between the point (x", y") and the point (x' and y'), the time t is partitioned at given timings, and a transition image is obtained from an interpolation point of each timing. Also, the transition calculation unit 50c can also perform returning calculation of the parallel projection image to the perspective projection image.

The deformation calculation unit 50d is a processing unit that changes the angle and the size of the perspective projection image when, for example, an instruction to rotate, expand, or reduce the perspective projection image of the three-dimensional structure is input from the input unit 10. Since this calculation is a known technology, the description thereof will be omitted. Also, the deformation calculation unit 50d may detect an angle of the information display device P based on information from a sensor such as a geomagnetic sensor or an acceleration sensor included in the information display device P and may change the angle of the perspective projection image according to the detected angle.

The position calculation unit 50e is a processing unit that calculates display positions of a current site in the perspective projection image, the transition image, and the parallel projection image based on current site information from the position detection unit 30. Since a process of matching the current positions with the perspective projection image, the transition image, and the parallel projection image is also a known technology, the description thereof will be omitted.

The display control unit 60 is a processing unit that controls display on the display unit 20. The display control unit 60 includes a perspective projection display control unit 60a, a deformation display control unit 60b, a transition image display control unit 60c, a parallel projection image display control unit 60d, a relevant information display control unit 60e, a position display control unit 60f, and a user interface (UI) control unit 60g.

Figure 2:
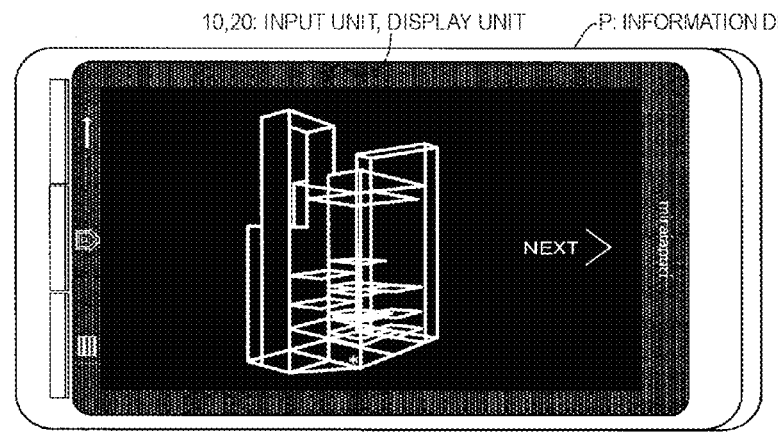
FIG. 2 is a diagram illustrating a display state of a perspective projection image on the information display device according to the embodiment.

The perspective projection display control unit 60a is a processing unit that displays the perspective projection image on the display unit 20 according to the calculation by the perspective projection calculation unit 50a. For example, as illustrated in FIG. 2, a line view of a three-dimensional building is displayed. In this example, a wire frame in which respective projection points are bound with lines is displayed. The drawing is basically a perspective view of a building. Planes indicating respective floors are displayed in a piled manner to overlap like actual floors.

Figure 3:
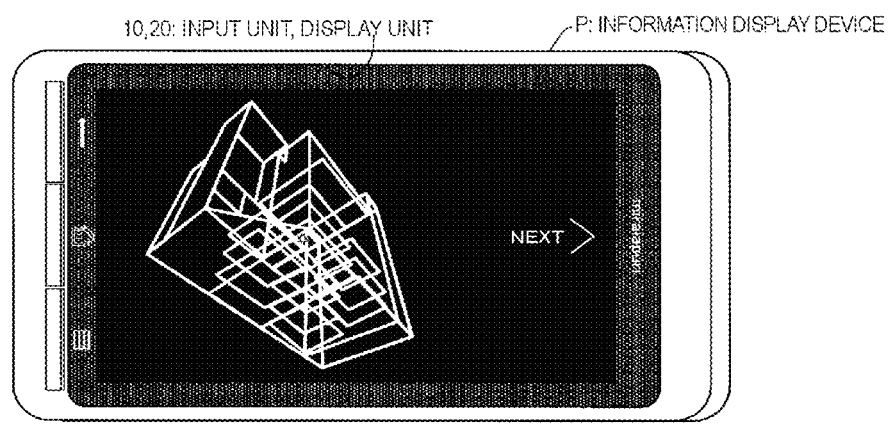
FIG. 3 is a diagram illustrating a rotation state of the perspective projection image in FIG. 2.

The deformation display control unit 60b is a processing unit that displays an image obtained by changing the angle or size of the perspective projection image on the display unit 20 according to the calculation by the deformation calculation unit 50d. For example, as illustrated in FIG. 3, an image rotated from the line view of the building exemplified in FIG. 2 is displayed.

Figure 4:
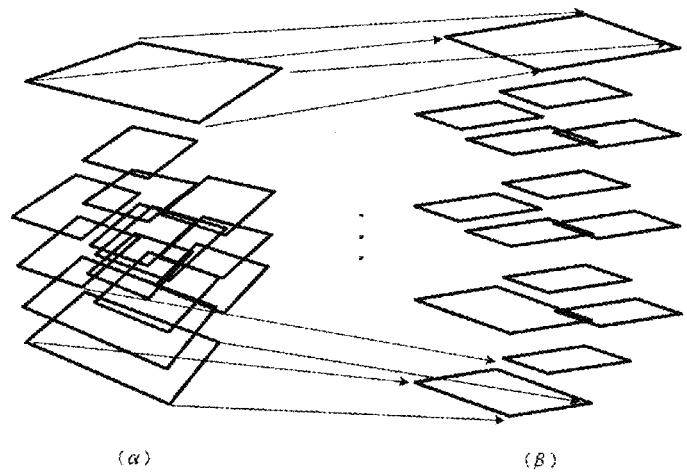
FIG. 4 is a diagram illustrating a change from the perspective projection image to a parallel projection image.

The transition image display control unit 60c is a processing unit that displays an image transitioned from a perspective projection image (α) to a parallel projection image (β) or from the parallel projection image to the perspective projection image according to the calculation result of the transition calculation unit 50c. For example, as illustrated in FIG. 4, images transitioned to a perspective projection image and a parallel projection image are displayed. Also, further detailed transition display examples are illustrated in FIGS. 7 to 11 to be described below.

Figure 5:
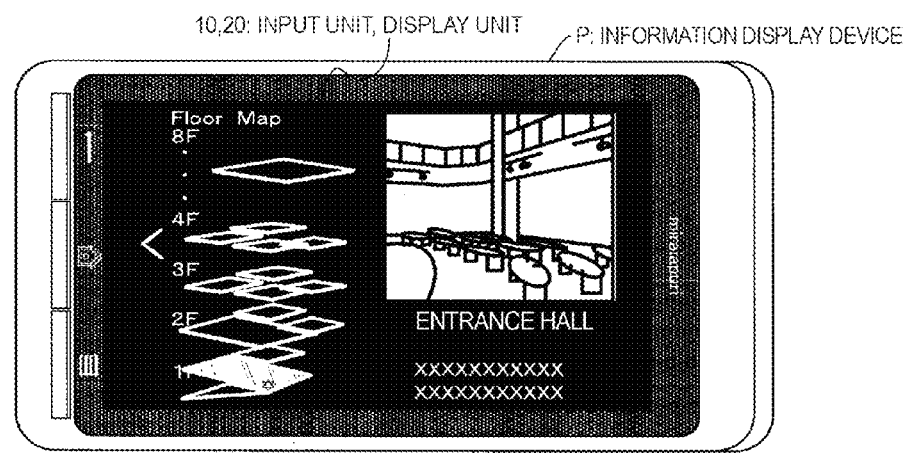
FIG. 5 is a diagram illustrating a display state of the parallel projection image and relevant information on the information display device according to the embodiment.

The parallel projection display control unit 60d is a processing unit that displays the parallel projection image calculated by the parallel projection calculation unit 50b. For example, as illustrated in FIG. 5, rectangles disposed vertically according to the order of actual floors are displayed as planes indicating respective floors. At this time, the respective planes are moved in a direction in which overlap is reduced more than in the perspective projection image according to setting of the transition calculation or the parallel projection calculation. In the example of the above expressions, since M and N are parameters for parallel movement, the planes can be adjusted such that overlap is reduced by setting the values of M and N or can be preferably adjusted such that the overlap does not occur. Also, coordinates in the parallel projection in addition to other parameters to be adjusted can be modified to form a layout which is easily viewed and is easily available as a user interface, according to an aspect ratio or parallel movement in units of groups. For example, in the case of a building, the positions of a plurality of floors (4 apexes when the floors are rectangular) can each be adjusted according to an aspect ratio and parallel movement from a screen in which the plurality of floors are realistically displayed in a perspective projection manner.

The relevant information display control unit 60e is a processing unit that displays information relevant to the planes included in the perspective projection image based on the relevant information stored in the relevant information storage unit 40b. For example, as illustrated in FIG. 5, a photo, a name, and an announcement of a selected floor are displayed next to the parallel projection image.

The position display control unit 60e is a processing unit that displays a current position in the perspective projection image or the parallel projection image. For example, as illustrated in FIGS. 2 and 3, a star indicating a current position mark is displayed at a corresponding position on a floor.

The UI control unit 60g is a processing unit that identifies a specific region in an image displayed on the display unit 20 as a UI region for an operation input. That is, the UI control unit 60g identifies the region of each floor, a button, an icon, an image, or the like as a region operable on the touch panel. Thus, the user can perform an operation input by swiping or touching each floor, the button, the icon, the image, or the like.

The present embodiment can be said to be a new aspect of so-called augmented reality (AR) from a function capable of acquiring relevant information regarding a three-dimensional structure from a real three-dimensional structure based on a perspective projection image of the three-dimensional structure.

In general, the information communication device P can be configured by installing an application program (hereinafter simply referred to as an app) on a smartphone. Therefore, settings, calculation expressions, parameters, and the like necessary for the process of each of the foregoing units are included in an app and are stored in advance in an internal memory or a removable memory.

The foregoing storage unit 40 can generally include a memory such as a built-in ROM or RAM. However, all storage media available now or in the future can be used as the storage unit 40. A register, a memory, or the like used as a temporary storage region is also included in the storage unit 40. Accordingly, a storage region temporarily stored for the process of each of the foregoing units can also be understood as the storage unit 40.

2. Action

Figure 6:
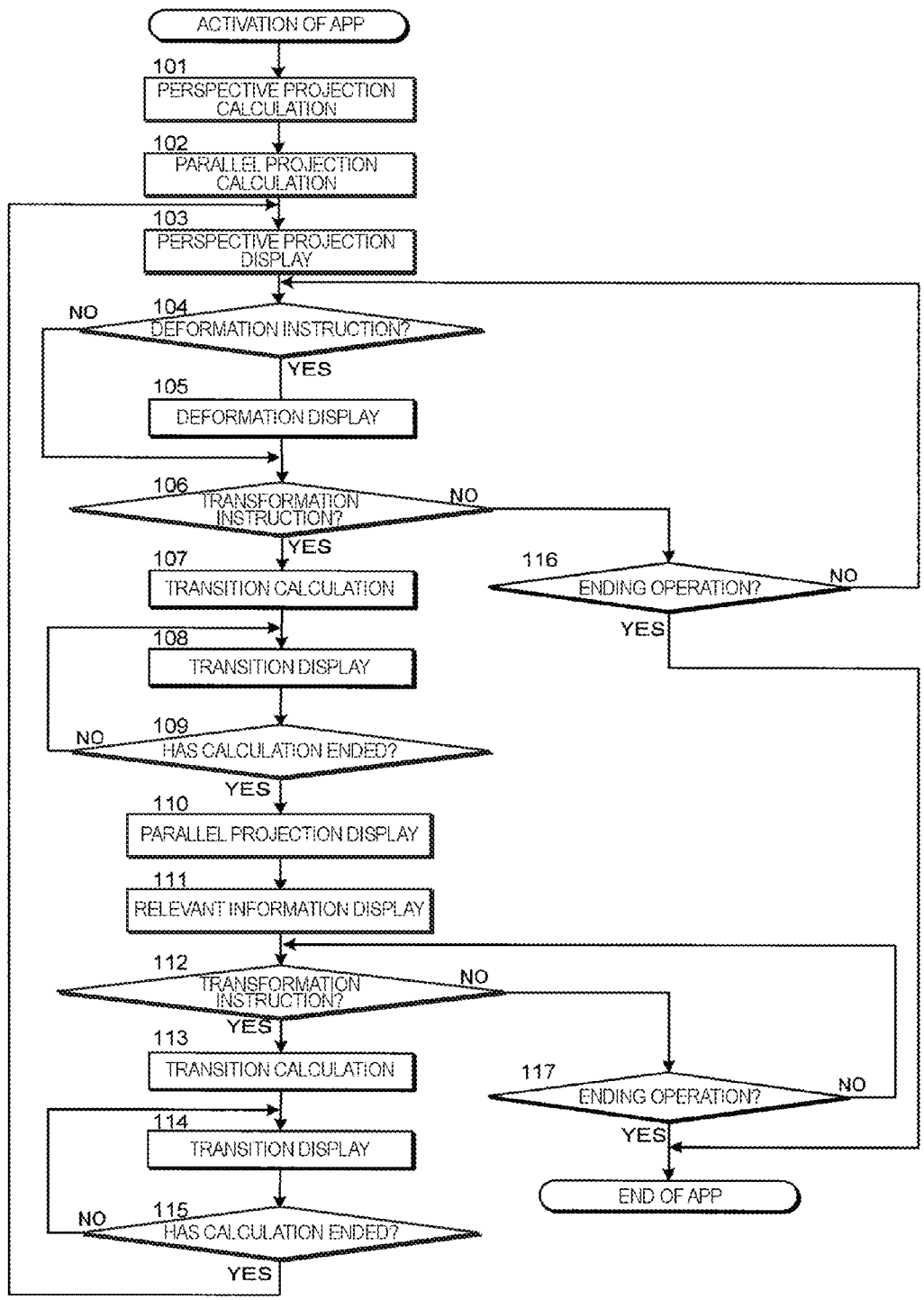
FIG. 6 is a flowchart illustrating an order of an information display process according to the embodiment.

An example of an image display process according to the above-described present embodiment will be described with reference to the flowchart of FIG. 6 and display screen examples of FIGS. 7 to 12. A method of displaying an image in the following order is also a kind of the present disclosure.

First, in the information communication device P, an app is assumed to be completely downloaded and installed in advance. Along with the app, the projection display data storage unit 40a stores projection display data and the relevant information storage unit 40b stores the relevant information.

The perspective projection calculation unit 50a performs the perspective projection calculation based on the projection display data (step 101). The calculation result is stored by the perspective projection data storage unit 40c. Then, the parallel projection calculation unit 50b performs the parallel projection calculation based on the projection display data (step 102). The calculation result is stored by the parallel projection data storage unit 40d.

The perspective projection display control unit 60a displays the perspective projection image which is the perspective projection calculation result by the perspective projection calculation unit 50a on the display unit 20 (step 103). At this time, the position display control unit 60f also displays the current position calculated by the position calculation unit 50e on the display unit 20.

Figure 7:
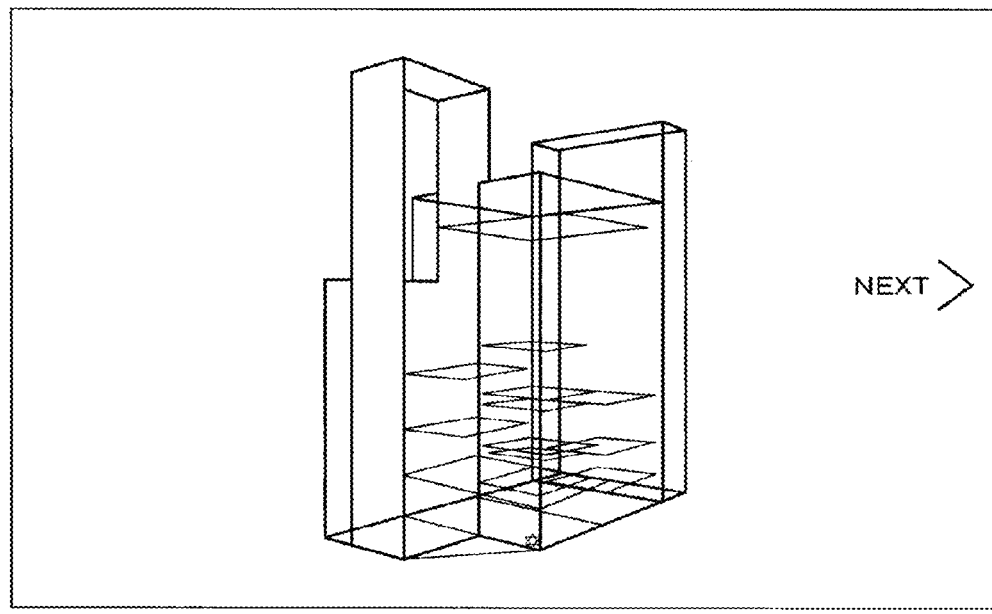
FIG. 7 is a diagram illustrating a display screen example of the perspective projection image according to the embodiment.

The display screen example is illustrated in FIGS. 2 and 7. In FIGS. 2 and 7, as described above, the perspective view of a building is illustrated and the star is displayed at the current site on 1F. Also, a button "NEXT >" is displayed as an input interface for transitioning to the parallel projection image.

Here, the user inputs, for example, a deformation instruction to rotate or expand the perspective projection image, using the input unit 10 (YES in step 104). Then, the deformation calculation unit 50d performs the deformation calculation of the perspective projection image according to an operation amount at the time of the input and the deformation display control unit 60b displays a deformed image which is the calculation result on the display unit 20 (step 105).

After the deformed image is displayed or when no deformation instruction is given (NO in step 104), the user inputs a transformation instruction from the perspective projection image to the parallel projection image using the input unit 10 (YES in step 106). For example, this input is performed when the user selects the button "NEXT >" to select the plane of a desired floor. Then, the transition calculation unit 50c calculates a transition image from the perspective projection image to the parallel projection image based on the perspective projection data and the parallel projection data (step 107).

Figure 8:
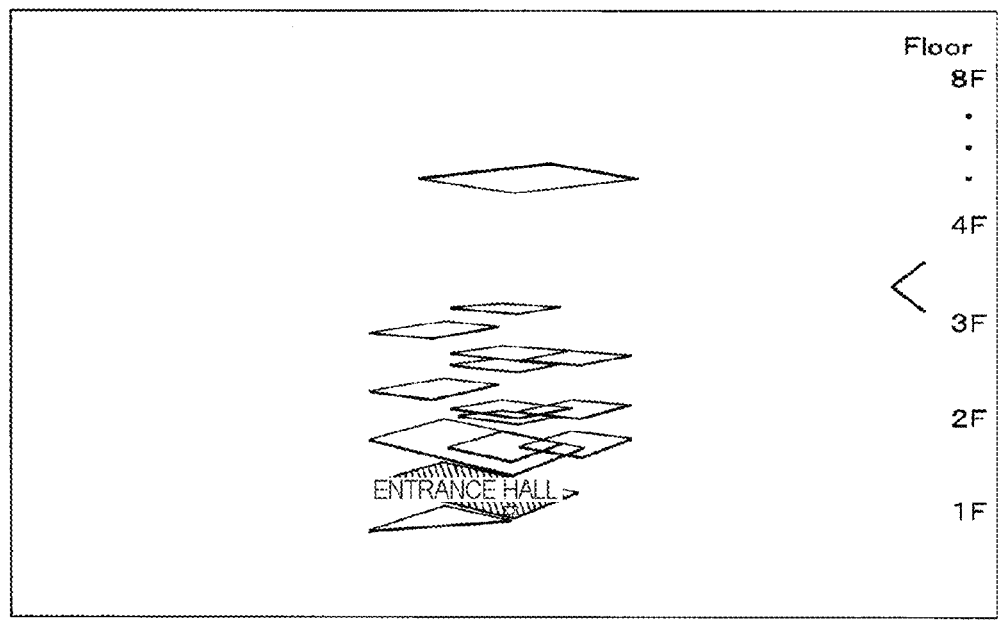
FIG. 8 is a diagram illustrating a display screen example of a transition image according to the embodiment.
Figure 9:
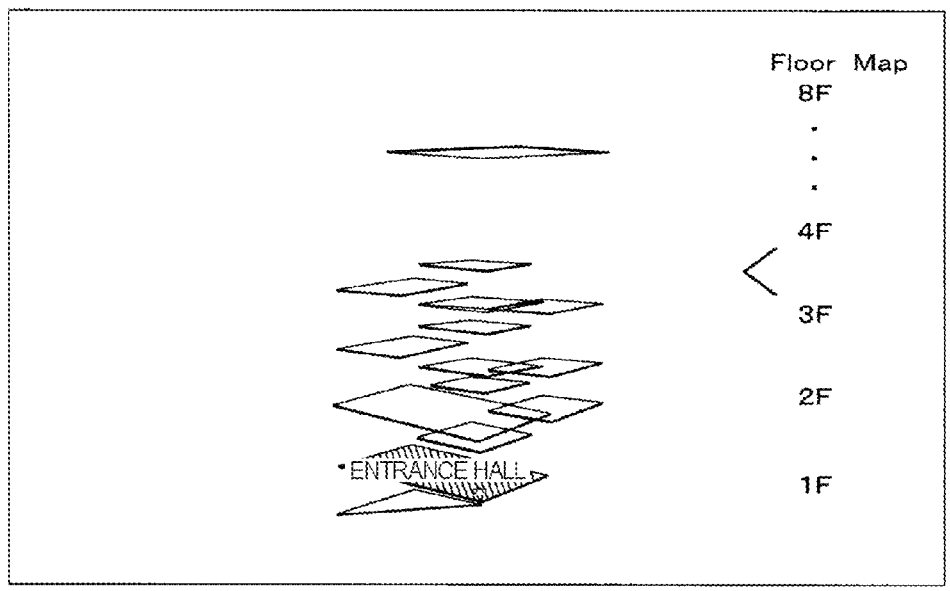
FIG. 9 is a diagram illustrating a display screen example of a transition image according to the embodiment.

Based on the calculation result, the transition image display control unit 60c displays the transition image (step 108). For example, as illustrated in FIG. 8, an image obtained by linearly interpolating the plane of each floor and character information indicating each floor are displayed. This display is a calculation result at each time point at which the preset time t is partitioned. The calculation and the display of the transition image are repeated until the set time t passes (NO in step 109). In this way, as illustrated in FIGS. 8 to 12, the image is transitioned.

Figure 10:
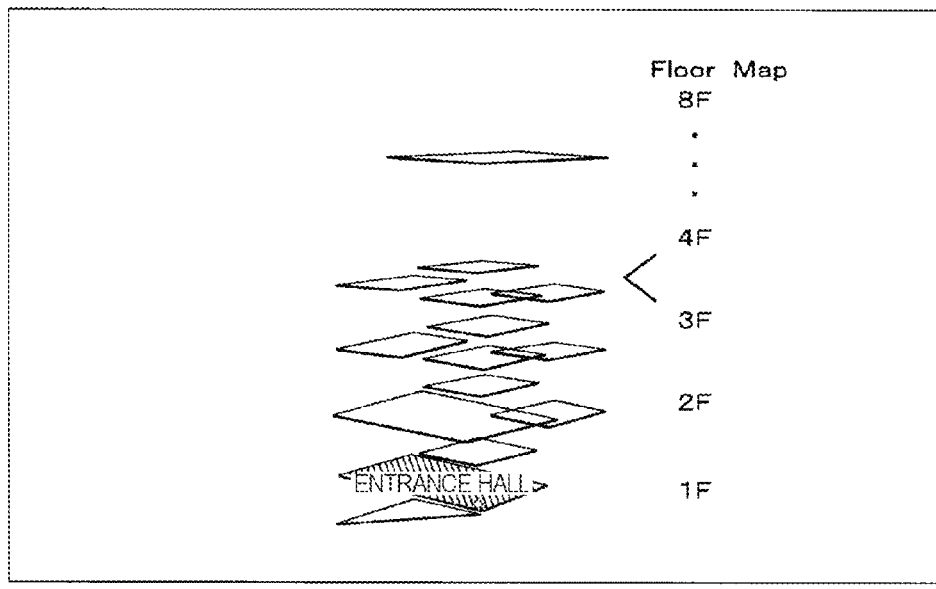
FIG. 10 is a diagram illustrating a display screen example of a transition image according to the embodiment.
Figure 11:
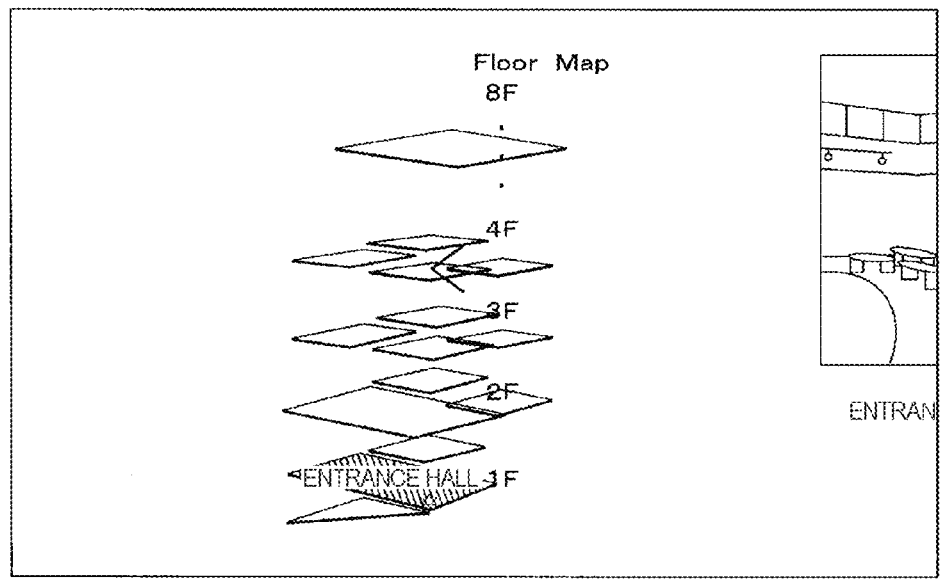
FIG. 11 is a diagram illustrating a display screen example of a transition image according to the embodiment.
Figure 12:
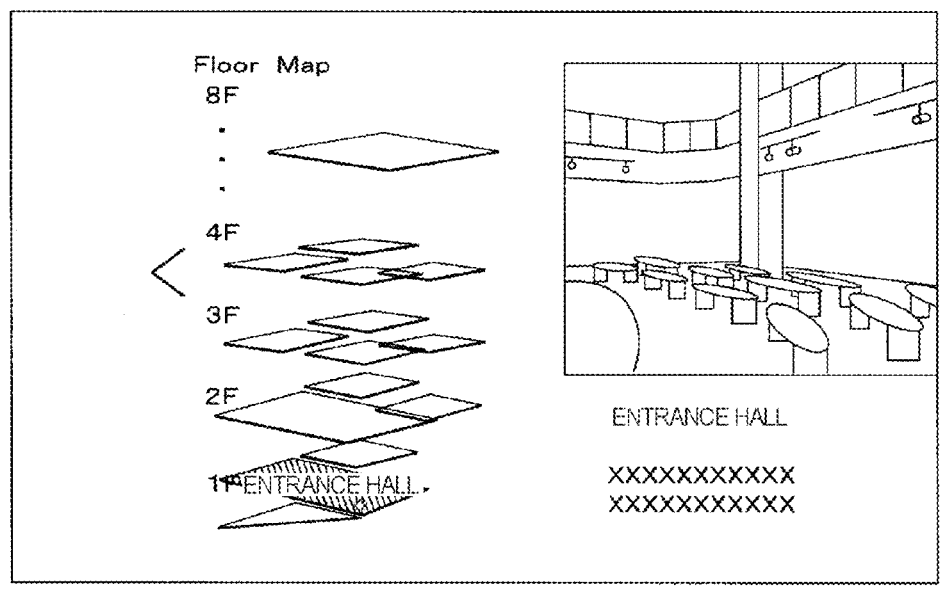
FIG. 12 is a diagram illustrating a display screen example of a transition image according to the embodiment.
Figure 13:
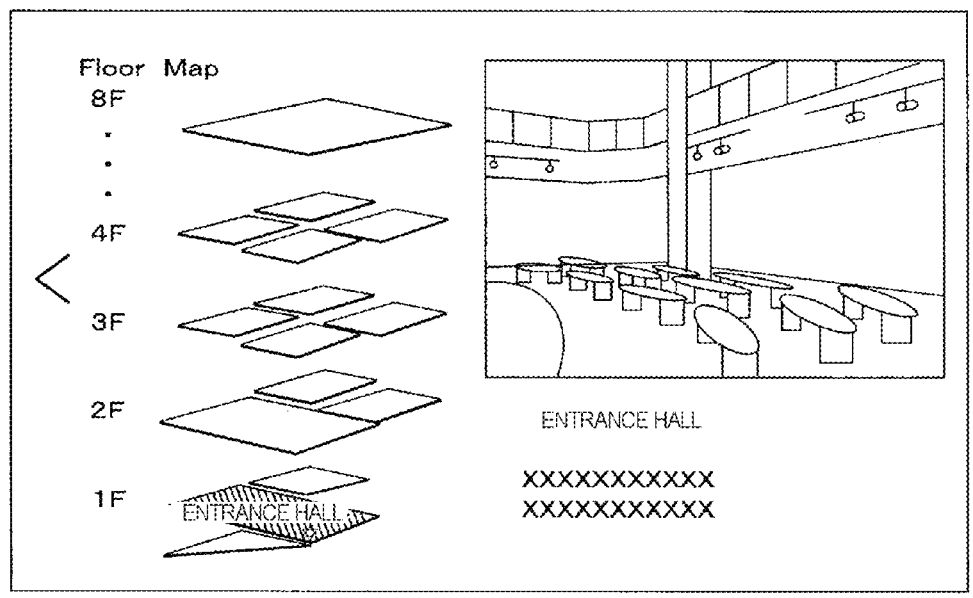
FIG. 13 is a diagram illustrating a display screen example of a parallel projection image and relevant information according to the embodiment.

When the set time t has passed and the calculation thus ends (YES in step 109), as illustrated in FIG. 13, a final parallel projection image is displayed (step 110). Also, as illustrated in FIGS. 10 to 12, the image and the character information of the selected floor are displayed as relevant information regarding the selected floor (step 111). By tapping the floor, the relevant information can be substituted with information regarding a tapped floor. Also, this display includes a button ">" as an input interface for transitioning to the perspective projection image.

The user inputs a transformation instruction from the perspective projection image to the parallel projection image using the input unit 10 (YES in step 112). The input is performed, for example, by selecting the button "NEXT >." Then, the transition calculation unit 50c calculates the transition image from the parallel projection image to the perspective projection image based on the perspective projection data and the parallel projection data (step 113).

Based on the calculation result, the transition image display control unit 60c displays the transition image (step 114). The calculation and the display of the transition image are repeated until the set time t passes (NO in step 115). In this way, as indicated in the order of FIGS. 11 to 7, the image is transitioned.

When the set time t has passed and the calculation thus ends (YES in step 115), as illustrated in FIG. 12, the original perspective projection image is displayed (step 103). When no transformation instruction is given in steps 106 and 112 and no ending instruction is given (NO in steps 116 and 117), the display up to the present time continues. When an app ending operation is performed (YES in steps 116 and 117), the app ends.

3. Advantageous Effects

The advantageous effects of the above-described embodiment are as follows. That is, since an image for transitioning planes included in a three-dimensional structure displayed in a perspective projection manner to a parallel projection image is displayed and information relevant to the planes is displayed, desired information relevant to the three-dimensional structure can be intuitively understood in relation to the whole three-dimensional structure.

For example, a user can intuitively understand the architecture of a building and a position relation based on the perspective projection image. Even when the user moves inside the building, the user can immediately understand where the user is moving and where the user is located inside the building by referring to the display of a current position and a stereoscopic perspective projection image.

In addition, when a desired floor is selected, the image is transitioned to a parallel projection image while the form of the floor is changed, and is transitioned to a final parallel projection image. Since the overlap of the floors is reduced in the parallel projection image, it is easy to select and understand each floor. At this time, detailed information regarding each floor can be obtained based on the relevant information regarding each floor.

Further, the transition image enables the user to understand a floor correspondence relation between the perspective projection image and the parallel projection image without interruption. Therefore, the user does not misunderstand whether a floor that he or she has selected corresponds to the perspective projection image or the parallel projection image. For example, when a screen is transitioned from a wire frame representing the shape of a building to a floor guide displaying information regarding each floor, a correspondence relation between common information portions on different screens can be clarified by connecting drawings of floors due to a seamless change.

Also, a service provider who uses a three-dimensional structure as a scene for providing services to a user can improve user convenience of the three-dimensional structure by distributing the app to the user. In addition, when a user enters a specific spot such as an entrance or the like of a building, a transmission and reception unit included in the information display device P can download or can automatically download and set an app or perspective projection data of the building, thereby further improving the user's convenience.

For example, when the app is distributed to users of department stores, shopping centers, show rooms, galleries, museums, airports, stations, hospitals, or the like, the users can understand the architecture of a building and their current position and can immediately acquire information regarding products for sale, shops, exhibition contents, services to be provided, or the like of each floor, thereby encouraging them to visit the shops, etc.

4. Other Embodiments

The present disclosure is not limited to the foregoing embodiment. For example, by displaying a marker at a desired position in a building, it is easy to further comprehend an actual direction and a position relation, and thus to understand a floor architecture as the floor is actually displayed in a perspective manner.

Icons of desired equipment, facilities, feature portions, and the like can also be displayed. For example, by displaying icons of toilets or elevators, users can easily locate such places. A navigation unit that searches for a route from a current position to a set destination and performs guiding can be provided. In this case, since the route guidance in the building displayed in a perspective projection manner is also based on a stereoscopic image, it is easy to understand a vertical relation.

Figure 14:
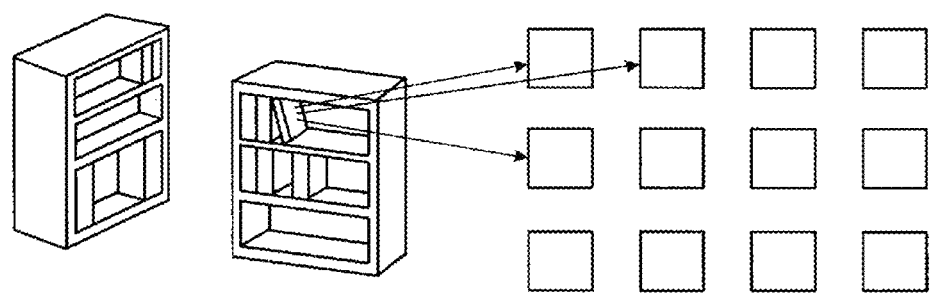
FIG. 14 is a diagram according to another embodiment.

A target three-dimensional structure is not limited to a building and the plurality of planes are not limited to the floors. For example, as illustrated in FIG. 14, a bookshelf in which books are arranged can be set as a three-dimensional structure displayed as a perspective projection image. An image is transitioned from a perspective projection image of the displayed bookshelf to a parallel projection image in which rectangles indicating books or contents of the books are arranged in a tile form. In each image in the parallel projection image, relevant information regarding each book or contents of each book and its relevant information are displayed. According to this aspect, each book or contents of each book can be stored more sensibly by the arrangement position of the book compared to list display or the like. The book can include an individual album or the like, and thus photos of the album can be displayed in the parallel projection image.

Also, display of a house in which various home appliances are installed as a perspective projection image and arrangement of forms indicating the home appliances as a parallel projection image can be considered. By displaying a position relation between the home appliances in the house in a perspective projection manner, the home appliances can be selected more intuitively or overview display or the like of power consumption indicating an interconnection state between the home appliances can be performed.

Also, a screen on which individual home appliances are operated can be displayed in a parallel projection manner. The screen displayed in a parallel projection manner can be set as a front panel of each home appliance, can be displayed by expanding information regarding content, or can be displayed by aligning the home appliances.

REFERENCE SIGNS LIST

P information display device
10 input unit
20 display unit 30 position detection unit
40 storage unit
40a projection display data storage unit
40b relevant information storage unit
40c perspective projection data storage unit
40d parallel projection data storage unit
50a perspective projection calculation unit
50b parallel projection calculation unit
50c transition calculation unit
50d deformation calculation unit
50e position calculation unit
60 display control unit
60a perspective projection display control unit
60b deformation display control unit
60c transition display control unit
60d parallel projection display control unit
60e relevant information display control unit
60f position display control unit
60g UI control unit

The invention claimed is:

1. A non-transitory computer-readable medium comprising code configured to cause a computer including a display to:
   store perspective projection data of a three-dimensional structure including a plurality of overlapping planes;
   store relevant information relevant to the plurality of planes;
   display a perspective projection image of a whole of the three-dimensional structure on the display based on the perspective projection data;
   store parallel projection data for displaying a parallel projection image of the plurality of planes included in the three-dimensional structure;
   display the parallel projection image of the plurality of planes on the display based on the parallel projection data;
   calculate transition image data to perform transition from the perspective projection image to the parallel projection image or from the parallel projection image to the perspective projection image based on the perspective projection data and the parallel projection data, wherein the plurality of planes in the parallel projection image are arranged in a direction in which overlap of the plurality of planes in the parallel projection image is less than overlap of the plurality of planes in the perspective projection image;
   display a transition image between the perspective projection image and the parallel projection image based on the calculated transition image data; and
   display the relevant information on the display.

2. The non-transitory computer-readable medium according to claim 1, wherein the code is further configured to cause the computer to:
   detect a current position of the computer; and
   display the detected current position in at least one of the perspective projection image and the parallel projection image.

3. The non-transitory computer-readable medium according to claim 1, wherein the code is further configured to cause the computer to:
   when one of the planes in the perspective projection image is selected through an input, calculate the transition image data, display the transition image, and set the relevant information as relevant information regarding the selected plane.

4. An information display device including a computer having a display, the information display device comprising:
   a processor including processing circuitry configured to:
   store perspective projection data of a three-dimensional structure including a plurality of overlapping planes;
   store relevant information relevant to the plurality of planes;
   display a perspective projection image of a whole of the three-dimensional structure on the display based on the perspective projection data;
   store parallel projection data for displaying a parallel projection image of the plurality of planes included in the three-dimensional structure;
   display the parallel projection image of the plurality of planes on the display based on the parallel projection data;
   calculate transition image data to perform transition from the perspective projection image to the parallel projection image or from the parallel projection image to the perspective projection image based on the perspective projection data and the parallel projection data, wherein the plurality of planes in the parallel projection image are arranged in a direction in which overlap of the plurality of planes in the parallel projection image is reduced more than overlap of the plurality of planes in the perspective projection image;
   display a transition image between the perspective projection image and the parallel projection image based on the calculated transition image data; and
   display the relevant information on the display.

* * * * *